(12) United States Patent
Jang et al.

(10) Patent No.: US 10,117,556 B2
(45) Date of Patent: Nov. 6, 2018

(54) BATTERY DISCHARGE CONTROL SYSTEM, CONTROL METHOD THEREOF, AND CLEANER INCLUDING THE SAME

(71) Applicant: LG ELECTRONICS INC., Seoul (KR)

(72) Inventors: Hoyong Jang, Seoul (KR); Seokhee Cho, Seoul (KR); Dukho Ham, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 406 days.

(21) Appl. No.: 14/977,947

(22) Filed: Dec. 22, 2015

(65) Prior Publication Data
US 2016/0183754 A1   Jun. 30, 2016

(30) Foreign Application Priority Data

Dec. 26, 2014 (KR) .................. 10-2014-0191050

(51) Int. Cl.
*H02J 7/00* (2006.01)
*A47L 9/28* (2006.01)

(52) U.S. Cl.
CPC .......... *A47L 9/2884* (2013.01); *A47L 9/2842* (2013.01); *H02J 7/007* (2013.01); *H02J 7/0031* (2013.01); *H02J 7/0063* (2013.01); *H02J 2007/004* (2013.01); *H02J 2007/0067* (2013.01)

(58) Field of Classification Search
CPC ..................................... H02J 7/0031
USPC ......................................... 320/136
See application file for complete search history.

(56) References Cited

U.S. PATENT DOCUMENTS

2005/0225289 A1* 10/2005 Iida ............... H01M 10/441
                                                    320/116
2011/0299209 A1    12/2011 Tajima et al.
2013/0049649 A1     2/2013 Park et al.

FOREIGN PATENT DOCUMENTS

| JP | 2006-122463 A | 5/2006 |
| JP | 2009-292187 A | 12/2009 |
| JP | 2010-160026 | 7/2010 |
| KR | 10-2004-0071248 | 8/2004 |

OTHER PUBLICATIONS

European Search Report dated May 10, 2016 issued in Application No. 15201435.3.
Korean Notice of Allowance dated Jun. 2, 2016 issued in Application No. 10-2014-0191050.
Korean Office Action dated Sep. 23, 2015 issued in Application No. 10-2014-0191050.

* cited by examiner

*Primary Examiner* — Edward Tso
*Assistant Examiner* — Ahmed Omar
(74) *Attorney, Agent, or Firm* — Ked & Associates, LLP

(57) ABSTRACT

Provided is a battery discharge control system including a voltage sensor configured to sense a voltage across a battery and a controller configured to calculate an expected voltage based on a recovery voltage of the battery and the voltage across the battery, compare the expected voltage and a predetermined final discharge voltage, and determine whether to apply power to a load having the battery as a power source.

20 Claims, 9 Drawing Sheets

BATTERY DISCHARGE CONTROL SYSTEM, CONTROL METHOD THEREOF, AND CLEANER INCLUDING THE SAME

CROSS-REFERENCE TO RELATED APPLICATION(S)

Pursuant to 35 U.S.C. § 119(a), this application claims the benefit of earlier filing date and right of priority to Korean Application No. 10-2014-0191050, filed in filed in Republic of Korea on Dec. 26, 2014 the contents of which are incorporated by reference herein in it entirety.

BACKGROUND

1. Field

The present disclosure relates to a battery discharge control system, a control method thereof, and a cleaner including the same.

2. Background

Battery discharge control systems, control methods of the same, and cleaners including the same are known. However, they suffer from various disadvantages.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION

Figure 1:
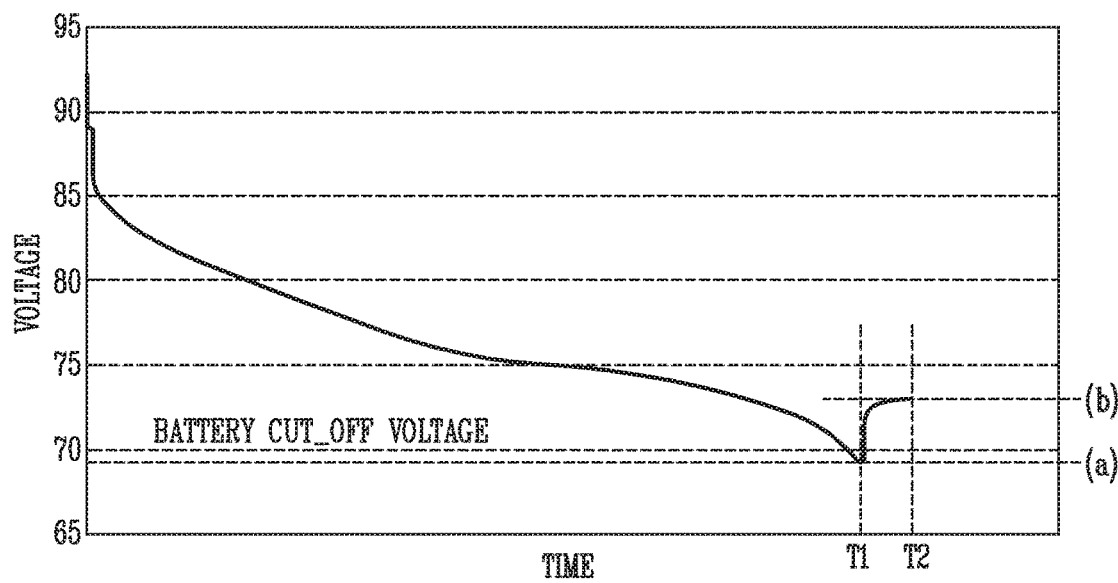
FIG. 1 is a general graph of voltage of a battery being discharged.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

A battery is a device that supplies electric current to the outside, and a device with a battery operates its components using electric energy supplied from the battery.

The term "battery" used herein is not limited to a specific type of battery. However, the description will be made with reference to a lithium iron battery, which is a kind of secondary cell battery and in which lithium ions move from a negative electrode to a positive electrode during a discharge process.

Recently, various portable electronic appliances with batteries, in particular, cleaners (e.g., a vacuum cleaner, robot cleaner, etc.) with batteries are being introduced.

A cleaner is a device that uses a suction motor to suck up air including foreign material such as dust, uses a filter inside the main body to remove the foreign material from the air, and discharge the filtered air. In general, a cleaner includes a main body having a suction motor, a suction nozzle that sucks air including foreign material of a floor surface, and an air pipe that moves the air sucked to the suction nozzle to the main body.

The cleaner may be classified into a canister type in which a suction nozzle for sucking up dust is provided separately from the main body and connected by a connector and an upright type in which a suction nozzle is rotationally connected with the main body.

FIG. 1 is a graph of voltage of a battery being discharged.

As shown in FIG. 1, when the battery is discharged, a voltage G1 across the battery (hereinafter referred to as a battery voltage) decreases to a final discharge voltage a with the elapse of time.

In general, when a storage battery is discharged to a predetermined degree, the rate in which the voltage drops is rapidly increased. Thus, the discharge of the storage battery should be stopped when the voltage drop is rapidly increased. When abnormal discharge lasts, the amount of electricity supplied to the outside is small, and also the storage battery is damaged. Thus the life of the storage battery may be shortened.

That is, the final discharge voltage a indicates a minimum discharge voltage on the basis of a normal battery. A device including a battery stops the operation when a voltage across the battery reaches the final discharge voltage a. In this case, when the battery is a lithium ion battery, the final discharge voltage a may be 2.5V for each cell, preferably, about 2.7V to about 3V.

However, when the voltage across the battery reaches the final discharge voltage a, and an electronic device (e.g., a cleaner) stops the operation, the voltage across the battery is recovered to increase by a predetermined voltage. Thus, as shown in FIG. 1, the voltage across the battery may have a value greater by the recovery voltage b than the final discharge voltage a.

That is, an electronic device (e.g., a cleaner) with a battery may recognize at time T1 that the battery is completely discharged and then may stop the operation. Although the electronic device receives an operation start command from the user, the electronic device should not be restarted. However, the electronic device may be restarted by a battery voltage increasing due to the battery recovery voltage.

That is, although the battery of the electronic device is discharged, and the display unit displays a discharge state, the electronic device may be restarted.

In addition, although the electronic device may operate for a time longer than T1 due to the recovery voltage, the electronic device may be previously stopped at the time T1, and thus a usage time may be shortened.

Accordingly, there is a need for technology to solve such problems. Provided herein is a battery discharge control system for controlling a discharge of the battery to secure a use time of an electronic device with a battery or prevent the electronic device from being restarted after the battery is completely discharged, a control method thereof, and a cleaner including the same.

Battery Discharge Control System

First Embodiment

Figure 2:
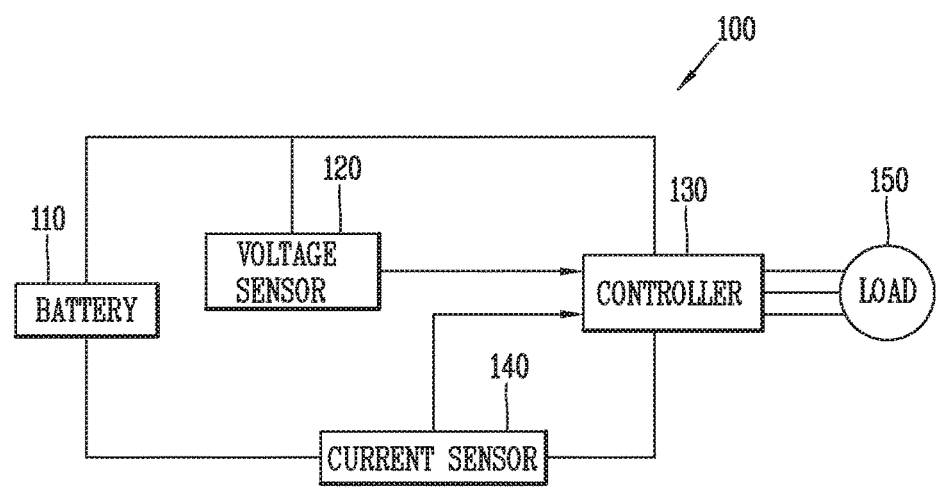
FIG. 2 is a block diagram of a battery discharge control system according to an embodiment of the present disclosure.

FIG. 2 is a block diagram of a battery discharge control system according to an embodiment of the present disclosure.

As shown in FIG. 2, a battery discharge control system 100 according to an embodiment of the present disclosure a voltage sensor 120 configured to sense a voltage across a battery 110 and a controller 130 configured to calculate an expected voltage on the basis of a recovery voltage of the battery 110 and the voltage across the battery 110, compare the expected voltage with a predetermined final discharged voltage, and determine whether power is applied to a load 150 having the battery 110 as a power source.

In this case, the elements shown in FIG. 2 are not essential, such that the battery discharge control system may be implemented to have more or less elements. Each element will be described below.

The voltage sensor 120 is a means for sensing a voltage across the battery 110. As long as the voltage sensor 120 has a configuration to sense the voltage across the battery 110, the voltage sensor 120 is not limited thereto. As an example, the voltage sensor 120 may include a voltage sensor (e.g., a voltage differential amplifier) or a voltage measurer and thus may be connected in parallel to the battery 110 to sense a voltage across the battery 110.

The current sensor 140 is a means for sensing a current output from the battery 110. In this case, the current sensed by the current sensor 140 may be an output current of a battery that is supplied to the load 150.

As long as the current sensor 140 is configured to sense the output current of the battery 110, the current sensor 140 is not limited thereto. However, as an example, the current sensor 140 may be a current sensor or a current measurer that is connected in series to the battery 110.

The battery 110 whose voltage or current is sensed by the voltage sensor 120 or the current sensor 140 is not limited in type. However, the description will be made with reference to a lithium iron battery, which is a kind of secondary cell battery and in which lithium ions move from a negative electrode to a positive electrode during a discharge process.

Figure 3:
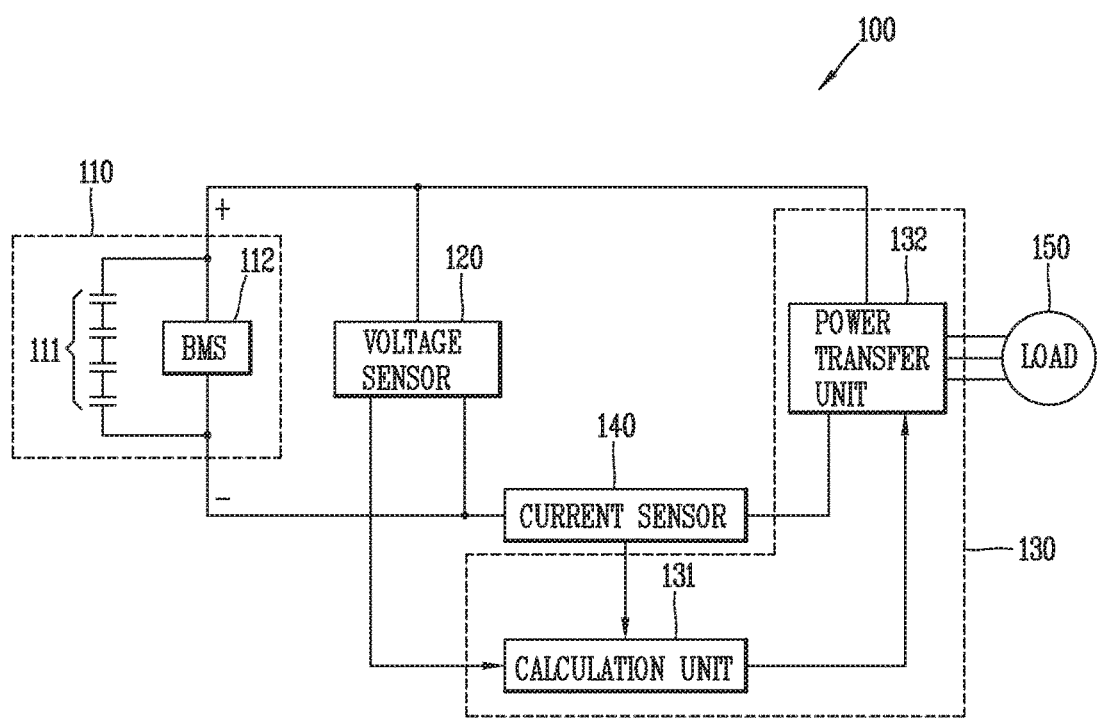
FIG. 3 is a block diagram of a battery discharge control system according to another embodiment of the present disclosure.

As an example, as shown in FIG. 3, the battery 110 may have a plurality of cells 111 having a predetermined voltage (e.g., about 2.7V to 4.2V) connected in series and/or in parallel according to the capacity and may further include a battery management system (BMS) 112 for operating, monitoring, and controlling the plurality of cells to manage the battery.

The controller 130 may calculate an expected voltage $V_E$ on the basis of a recovery voltage $V_{IR}$ of the battery 110 and a battery voltage $V_d$ 110 and compare the expected voltage $V_E$ with a predetermined final discharge voltage $V_{cutoff}$ to determine whether the power is applied to the load 150 having the battery 110 as a power source or limit the power applied to the load 150.

The recovery voltage $V_{IR}$ of the battery 110 may denote a voltage across the battery 110 recovered by a predetermined magnitude of voltage when the output of the battery 110 is stopped or limited after the voltage across the battery 110 reaches the predetermined final discharge voltage $V_{cutoff}$, by discharging energy stored in the battery 110 by driving the load 150.

That is, the recovery voltage $V_{IR}$ corresponds to the output current of the battery 110 and may vary in magnitude according to the output current of the battery 110. As an example, when the output voltage of the battery 110 reaches the final discharge voltage $V_{cutoff}$, and the output current of the battery 110 is 0, the magnitude of the recovery voltage $V_{IR}$ is the maximum.

In this case, the recovery voltage $V_{IR}$ may be calculated in various methods. However, according an embodiment, the controller 130 may calculate the recovery voltage $V_{IR}$ on the basis of a final discharge current $I_e$ and a battery internal resistance R, using the following Equation (1):

$$V_{IR} = R \times I_e \qquad \text{[Equation (1)]}$$

where R denotes the internal resistor of the battery 110, and $I_e$ denotes the final discharge current.

A value of the internal resistor of the battery 110 is stored by the controller 130 as a predetermined value, measured using a means (not shown) for measuring battery internal resistance, or calculated on the basis of a voltage value and/or a current value that is sensed by the voltage sensor 120 and/or the current sensor 140. In addition, it will be appreciated that the value of the internal resistor of the battery 10 may be measured or calculated in various methods.

Figure 4A:
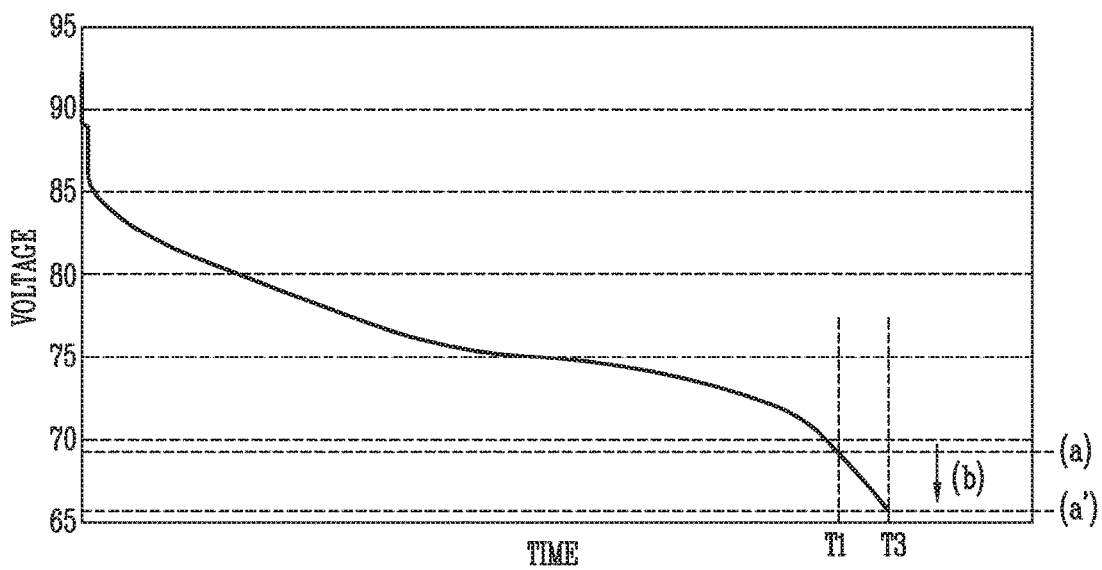
FIG. 4A is a graph of voltage of a battery being discharged when a battery discharge control system is applied according to an embodiment of the present disclosure.
Figure 4B:
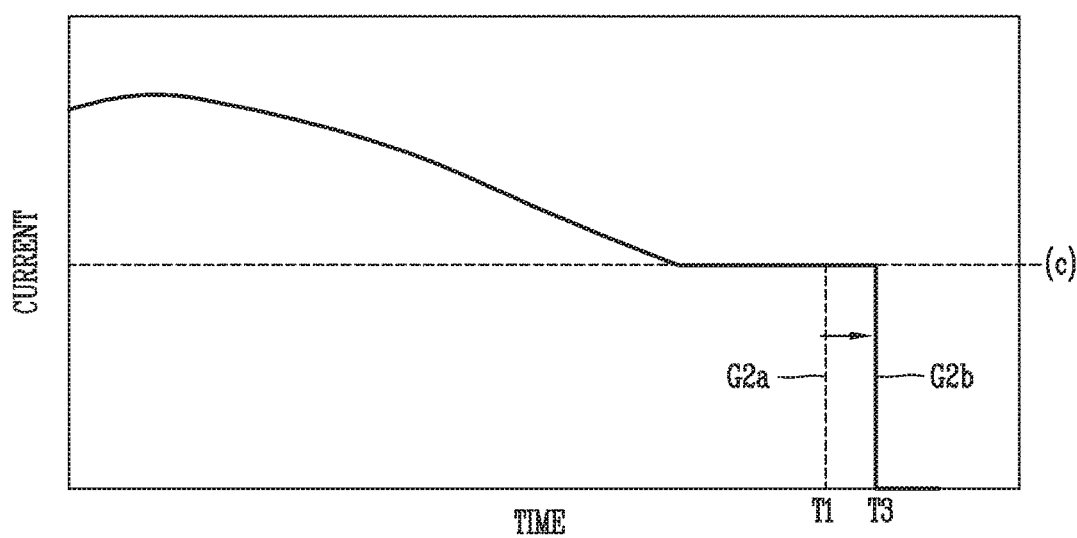
FIG. 4B is a graph of current in a battery being discharged when a battery discharge control system is applied according to an embodiment of the present disclosure.

The term "final discharge current" used herein corresponds to reference numeral (c) of FIG. 4B and indicates the output current of the battery when the battery output voltage reaches the final discharge voltage $V_{cutoff}$. That is, the final discharge current $I_e$ may be a battery output current at T1.

Thus, the controller 130 may use the output current of the battery 110 sensed by the current sensor 140 to consider the current sensed when the battery output voltage reaches the final discharge voltage $V_{cutoff}$ as the final discharge current Ie.

Accordingly, the final discharge current $I_e$ may vary depending on the power used by the load 140 according to an input of the user.

According to another embodiment, the controller 130 may consider the recovery voltage $V_{IR}$ as a predetermined value $V_{con}$. In addition, it will be appreciated that the controller 130 may calculate the recovery voltage $V_{IR}$ differently from Equation (1).

The controller 130 may calculate the expected voltage $V_E$ on the basis of the recovery voltage $V_{IR}$ and the battery voltage $V_d$ sensed by the voltage sensor 120.

In detail, the controller 130 may calculate the expected voltage $V_E$, using the following Equation (2) and Equation (3):

$$V_E = V_d - V_{IR},\quad \text{[Equation (2)]}$$

$$V_E = V_d - V_{con}.\quad \text{[Equation (3)]}$$

That is, the controller 130 may use the expected voltage $V_E$ calculated on the basis of the recovery voltage $V_{IR}$ to compare the expected voltage $V_E$ with the final discharge voltage $V_{cutoff}$ and control power supplied to the load 150 having the battery 110 as a power source according to a result of the comparison. Thus, the controller 130 may supply, cut off, limit, or change power supplied to the load 150 over time according to the comparison result.

The final discharge voltage $V_{cutoff}$ is a predetermined fixed value, and is equal to or greater than 2.5V for each cell, preferably, about 2.7V to 3V.

Accordingly, according to an embodiment, the controller 130 may discharge the battery 110 until the expected voltage $V_E$ reaches the final discharge voltage $V_{cutoff}$, that is, until the expected voltage $V_E$ decrease to (below) the final discharge voltage $V_{cutoff}$ by driving the load 150.

FIG. 4A is a graph of voltage of a battery being discharged when a battery discharge control system is applied according to an embodiment of the present disclosure.

As shown in FIG. 4A, as an example, when the final discharge voltage $V_{cutoff}$ is 69 V (see numeral reference (a)), conventionally, the battery 110 may be discharged to drive the load 150 when the battery voltage $V_d$ is 69 V. However, according to an embodiment of the present disclosure, when the recovery voltage $V_{IR}$ is 3V, the battery 110 may be discharged to drive the load 150 until the battery voltage $V_d$ is 66V (see numeral reference a'). Thus, the battery discharge control system 100 according to an embodiment of the present disclosure may extend an operating time of the load 150 from conventional T1 to T3 in consideration of the recovery voltage $V_{IR}$.

In terms of the output current when the battery is discharged, the battery 110 may output electric current up to T1 along a conventional G2a graph. However, the battery discharge control system 100 according to an embodiment of the present disclosure may extend the operating time of the load 150 from conventional T1 to T3 by the battery 110 outputting the current up to T3 along the G2b graph.

When the expected voltage $V_E$ is smaller than the predetermined final discharge voltage $V_{cutoff}$, the controller 130 may cut off the power supplied to the load 150, thus preventing the battery from being damaged or preventing the life of the battery from being reduced.

FIG. 3 is a block diagram of a battery discharge control system according to another embodiment of the present disclosure.

As shown in FIG. 3, the controller 130 may include a calculation unit 131 configured to calculate the expected voltage $V_E$ and a power transfer unit 132 configured to determine whether the power of the battery 110 is applied to the load 150 on the basis of a result of comparing the expected voltage $V_E$ with the final discharge voltage $V_{cutoff}$ and control whether the power is applied to the load 150 according to a result of the determination.

The calculation unit 131 may use the output current of the battery 110 sensed by the current sensor 140 to detect the final discharge current $I_e$ and may calculate the recovery voltage $V_{IR}$ on the basis of the final discharge current $I_e$ and the battery internal resistance R. In addition, the calculation unit 131 may calculate the expected voltage $V_E$ using a voltage across the battery 110 sensed by the voltage sensor 120 in addition to the recovery voltage.

In addition, the power transfer unit 132 may include a switch device or relay positioned at a front end of the load 150 and configured to control an electric connection between the battery 110 and the load 150 in order to supply or cut off the power stored in the battery 110 to the load 150. In this case, the power transfer unit 132 may be positioned at the front end of the load 150 and connected in series to the battery 110 or connected in series to the battery 110 and the current sensor 140.

A control signal for allowing the power transfer unit 132 to supply or cut off the output power of the battery 110 to the load 150 may be based on the expected voltage $V_E$ and the final discharge voltage $V_{IR}$ as described above, and may be received from the calculation unit 131. In addition, the power transfer unit 132 may generate the control signal according a result of comparing the expected voltage $V_E$ calculated by the calculation unit 131 with the final discharge voltage $V_{cutoff}$.

Second Embodiment

As described above, according to an embodiment of the present disclosure, the battery discharge control system 100 may cut off the power supplied to the load 150 or may limit the power supply instead of shutting off the power supply.

When the expected voltage $V_E$ is smaller than (or equal to) the final discharge voltage $V_{cutoff}$, the controller 130 may limit the power supply to the load 150 and allows the load 150 to perform a limited operation.

That is, the controller 130 may control the output current of the battery 110 which is output to the load 150, such that the electronic device including the battery discharge control system 100 according to an embodiment of the present disclosure decreases its own output.

Figure 5A:
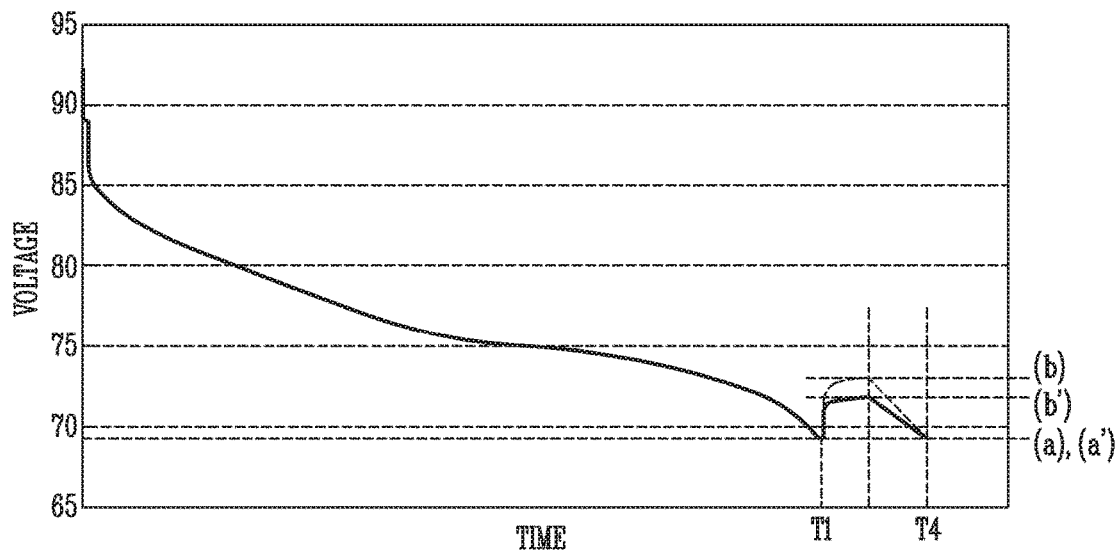
FIG. 5A is a graph of voltage of a battery being discharged when a battery discharge control system is applied according to another embodiment of the present disclosure.

As shown in FIG. 5A, the controller 130 may compare the expected voltage $V_E$ with the final discharge voltage $V_{cutoff}$, supply the power to the load 150 to discharge the battery 110 until the expected voltage $V_E$ reaches the final discharge voltage $V_{cutoff}$, and limit the power supplied to the load 150 when the expected voltage $V_E$ is small than (or equal to) the final discharge voltage $V_{cutoff}$.

Figure 5B:
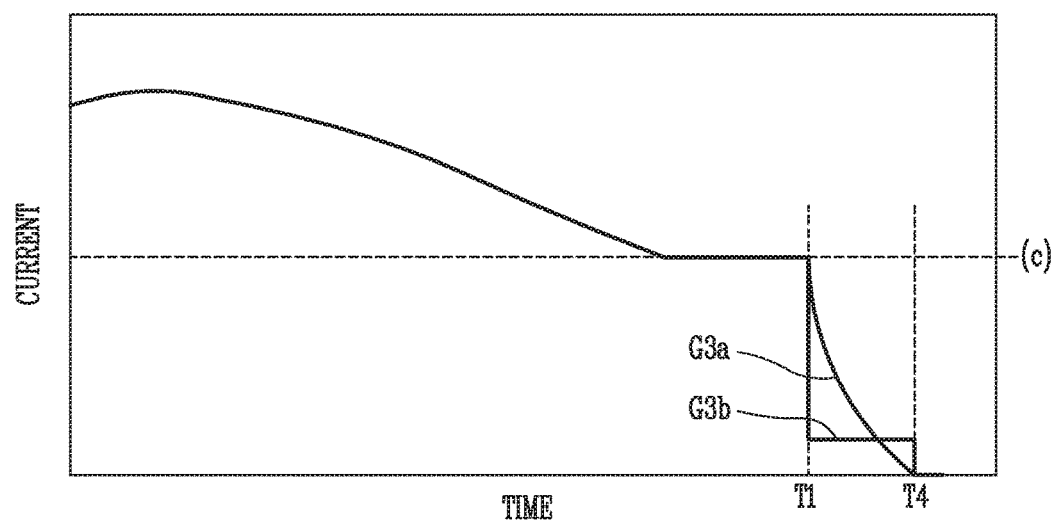
FIG. 5B is a graph of current in a battery being discharged when a battery discharge control system is applied according to another embodiment of the present disclosure.

That is, as shown in FIG. 5B, when the expected voltage $V_E$ is smaller than (or equal to) the final discharge voltage $V_{cutoff}$, the controller 130 may perform control such that the battery 110 discharge the current having a smaller magnitude than the final discharge current Ie. As an example, the controller 130 may allow the battery 110 to constantly discharge the current having a smaller magnitude than the final discharge current $I_e$ (output current along graph G3b) or may control the output current having a smaller magnitude than the final discharge current $I_e$ to change over time, preferably, decrease over time (output current along graph G3a).

An operation stop time T4 of the electronic device including the battery discharge control system may be varied by the controller 130 varying the magnitude of the output current when controlling the current having the smaller magnitude than the final discharge current Ie.

Here, the load 150 may be each element included in the electronic device equipped with the battery discharge control system 100 according to an embodiment of the present disclosure.

Figure 8:
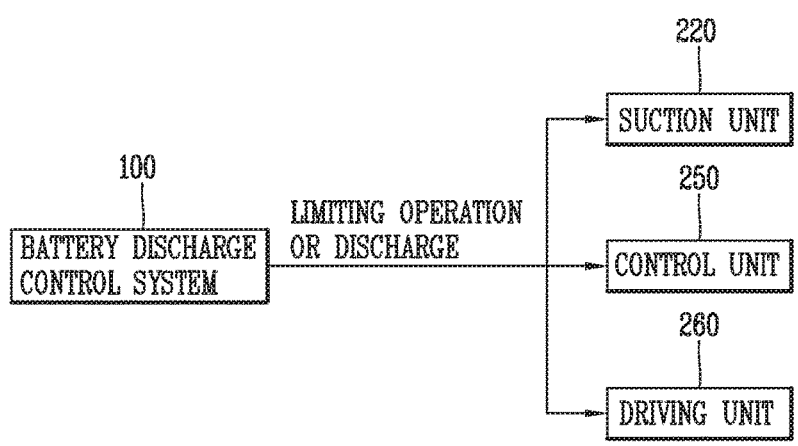
FIG. 8 is a block diagram showing that a battery discharge control system is connected with discharge objects when a recovery voltage is discharged according to an embodiment of the present disclosure.

In detail, when a cleaner to be described below includes the battery discharge control system 100 according to an embodiment of the present disclosure, the controller 130 may supply the remaining power of the battery 110 to at least one of the suction unit 220, the control unit 250, and the driving unit 260 (when the cleaner is an autonomous moving cleaner according to an embodiment of the present disclosure) as standby power or driving power, as shown in FIG. 8. Preferably, the controller 130 may limit an output of a suction motor and/or a driving motor included in the suction unit 220 and/or the driving unit 260 and thus may reduce a suction force, a moving speed, or a rotational speed, compared with a user's input or a predetermined value.

A graph of an output voltage of the battery is as shown in FIG. 5A. When the output current of the battery 110 is limited, the magnitude of the output voltage of the battery 110 corresponds to the magnitude of the output current. Accordingly, although the battery voltage is recovered by a predetermined magnitude, the magnitude of the voltage is smaller than a conventional final discharge voltage $V_{IR}$ (the magnitude of reference number b of FIG. 5A) due to the limited output of the battery 110. Subsequently, with the elapse of time, the battery voltage $V_d$ 110 may gradually decrease to the final discharge voltage $V_{cutoff}$ by discharging the battery 110.

The controller 130 may repeat the above-described limiting operation at least one time when the battery voltage $V_d$ is smaller than (or equal to) the final discharge voltage $V_{cutoff}$.

In addition, after performing the above-described limiting operation, the controller 130 may perform the limiting operation again with the elapse of time or after the limiting operation is stopped. In detail, the controller 130 may repeat the above-described limiting operation a predetermined number of times or may repeat the above-described limiting operation until the recovery voltage $V_{IR}$ recovered by the limiting operation is equal to or smaller than a predetermined voltage.

In addition, as described below, before or after performing the limiting operation, the controller 130 may perform the discharge process.

As described above, the battery discharge control system 100 according to an embodiment of the present disclosure may supply power to the load 150 to discharge the battery 110 until the expected voltage $V_E$ reaches the final discharge voltage $V_{cutoff}$. When the expected voltage $V_E$ is smaller than (or equal to) the final discharge voltage $V_{cutoff}$, the battery discharge control system 100 according to an embodiment of the present disclosure may limit the power supplied to the load 150. Alternatively, the battery discharge control system 100 according to an embodiment of the present disclosure may supply power to the load 150 to discharge the battery 110 until the battery voltage $V_d$ 110 that does not consider the recovery voltage $V_{IR}$, rather than the expected voltage $V_E$, reaches the final discharge voltage $V_{cutoff}$ and may limit the power supplied to the load 150 when the battery voltage $V_d$ is smaller than the final discharge voltage $V_{cutoff}$.

By discharging the battery 110 to the final discharge voltage $V_{cutoff}$, the controller 130 limits the power supply instead of immediately shutting off the power supplied to the load 150 although the controller 130 recognizes that the battery 110 is completely discharged. Accordingly, a user who uses the electronic device is induced to perform a final operation without being embarrassed about sudden operation stop. In addition, a continuous operation may be performed without stopping the operation of the electronic device by inducing the user to charge the battery in the electronic device driven by the limited power.

The remaining power of the battery 110 is consumed through the above-described limiting operation even after the controller 130 recognizes that the battery is completely discharged to cut off the power supplied to the load 150. Accordingly, a problem in which the load 150 is restarted may be prevented from occurring when a command for driving the load 150 is received from the user.

Third Embodiment

As described above, according to an embodiment of the present disclosure, the battery discharge control system 100 may cut off or limit power supplied to the load 150. Subsequently, the controller 130 may allow the remaining power of the battery 110 to be consumed.

As described above, the controller 130 may compare the expected voltage $V_E$ with the final discharge voltage $V_{cutoff}$, supply the power to the load 150 to discharge the battery 110 until the expected voltage $V_E$ reaches the final discharge voltage $V_{cutoff}$, and cut off or limit the power supplied to the load 150 when the expected voltage $V_E$ is small than (or equal to) the final discharge voltage $V_{cutoff}$.

As describe above, even after the power supplied to the load is cut off or limited, the voltage across the battery 110 may be recovered to increase by a predetermined magnitude of voltage. In this case, the battery discharge control system according to an embodiment of the present disclosure may consume the remaining power of the battery in order to consume the increasing recovery voltage.

In this case, the controller 130 may consume the remaining power of the battery in order to consume the recovery voltage. Preferably, the battery 110 may be consumed until the voltage $V_d$ across the battery 110 reaches the final discharge voltage $V_{cutoff}$.

That is, as an example, when the final discharge voltage $V_{cutoff}$ of the battery 110 is greater than the expected voltage $V_E$, the controller 130 may determine whether the remaining amount of the battery 110 is consumed. When the voltage $V_d$ across the battery is greater than the final discharge voltage $V_{cutoff}$ of the battery, the controller 130 may consume the remaining amount of the battery.

The controller 130 may consume the remaining power of the battery in various methods. However, according to an embodiment, the controller 130 may supply power to elements included in the battery discharge control system 100. In detail, standby power may be supplied to at least one of the controller 130 (or the calculation unit and/or the power transfer unit 132 included in the controller 130), the voltage sensor 120, and the current sensor 140.

According to another embodiment, the controller 130 may consume the remaining power of the battery 110 by supplying power to the load 150.

Here, the load 150 may be each element included in the electronic device equipped with the battery discharge control system 100 according to an embodiment of the present disclosure.

In detail, when a cleaner to be described below includes the battery discharge control system 100 according to an embodiment of the present disclosure, the controller 130 may supply the remaining power of the battery 110 to at least one of the suction unit 220, the control unit 250, and the driving unit 260 (when the cleaner is an autonomous moving cleaner according to an embodiment of the present disclosure) as standby power or driving power, as shown in FIG. 8. As an example, the controller 130 may drive a suction motor and/or a driving motor included in the suction unit 220 and/or the driving unit 260.

According to another embodiment, the controller 130 may consume the remaining power of the battery 110 by continuously supplying power to a discharge circuit (not shown) electrically connected inside or outside the battery discharge control system 100.

Figure 6A:
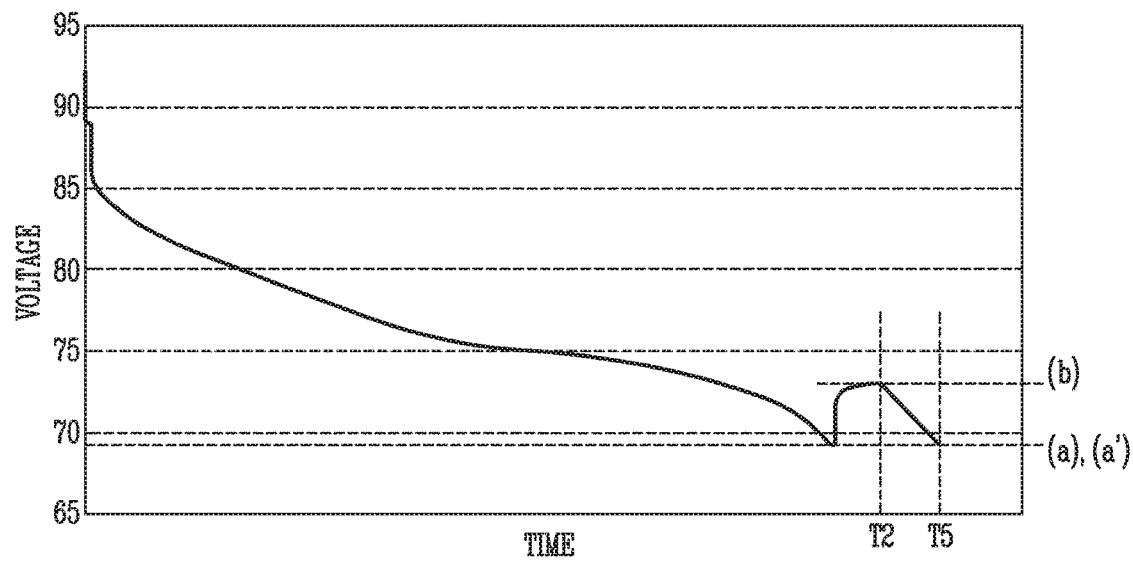
FIG. 6A is a graph of voltage of a battery being discharged when a battery discharge control system is applied according to another embodiment of the present disclosure.
Figure 6B:
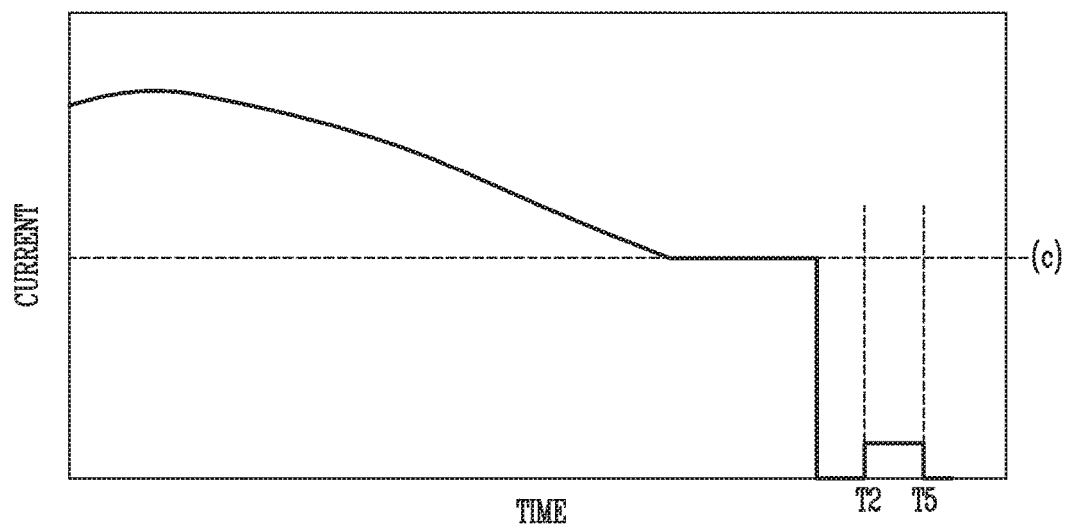
FIG. 6B is a graph of current in a battery being discharged when a battery discharge control system is applied according to another embodiment of the present disclosure.

In this case, as shown in FIG. 6B, the current output by the battery 110 during the discharge process in which the controller 130 consumes the remaining power of the battery may be a current having a smaller magnitude than the final discharge current Ie.

The controller 130 performs the above-described discharge process after the controller 130 shuts off the power supplied to the load 150 and then the recovery voltage $V_{IR}$ occurs. As a detailed example, the controller 130 may perform the above-described discharge process when a predetermined time has passed after the controller 130 shuts off the power supplied to the load 150 or when a variation in voltage measured by the voltage sensor 120 is smaller than a predetermined variation.

In addition, the controller 130 may repeat the above-described discharge process at least one time when the voltage $V_d$ across the battery is smaller than (or equal to) the final discharge voltage $V_{cutoff}$.

Furthermore, after performing the above-described discharge process, the controller 130 may perform the discharge process again with the elapse of time or after the discharge process is stopped. In detail, the controller 130 may repeat the above-described discharge process a predetermined number of times or may repeat the above-described discharge process until the recovery voltage $V_{IR}$ recovered by the discharge process is equal to or smaller than a predetermined voltage.

As described above, by consuming the remaining power of the battery 110, a problem in which the load 150 is restarted may be prevented from occurring when a command for driving the load 150 is received from the user after the controller 130 recognizes that the battery is completely discharged to cut off the power supplied to the load 150.

Cleaner

As described above, the battery discharge control system 100 according to an embodiment of the present disclosure may be included in various kinds of electronic devices. As a detailed example, the battery discharge control system 100 may be included in a cleaner.

Figure 7:
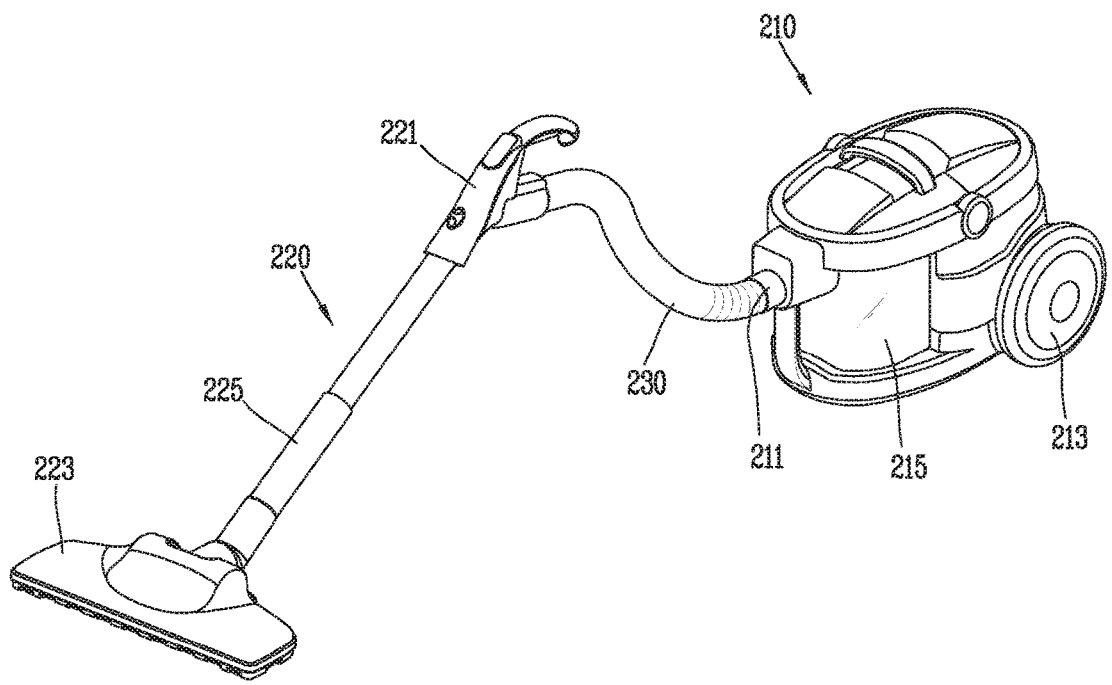
FIG. 7 is a perspective view of a cleaner to which a battery discharge control system has been applied according to an embodiment of the present disclosure.

FIG. 7 is a perspective view of a cleaner to which a battery discharge control system has been applied according to an embodiment of the present disclosure.

As shown in FIG. 7, the cleaner according to an embodiment of the present disclosure may include a main body 210, a suction unit 220 having a handle and configured to suck up surrounding foreign material, and an air pipe 230 configured to connect the main body 210 and the suction unit 220 and guide the foreign material into the main body 210.

Here, the cleaner may include at least one wheel installed below the main body 210.

The main body 210 may further include a dust collection device 215 that is detachably installed. The dust collection device 215 may be called a dust separation device. The dust collection device 215 may be detachably installed in the front end of the main body 210. Various filters may be detachably combined with the dust collection device 215. The rotation of the suction motor creates a suction force. While an air sucked by the created suction force passes through the dust collection device 215, dust is separated from the air and stored in the dust collection device 215.

The suction unit 220 includes a handle 221 in order for the user to manipulate an operation of the cleaner. In addition, the suction unit 220 includes a suction head 223 positioned on a floor surface to suck up the foreign material and the air. A suction hole is formed on a bottom surface of the suction head and configured to suck up the foreign material, such as the dust on the floor surface, and the air. An agitator is rotatably formed in the suction hole to guide the foreign material such as dust into the suction hole. The suction unit 220 may further include an extension pipe 225 that connects the handle 221 and the suction head 223.

The air pipe 230 may be formed in a foldable shape. In addition, the air pipe 230 may be made of synthetic resin, etc. The air pipe 230 has one side connected to the suction unit 220 and the other side connected to the main body 210, that is, a connection pipe 211.

The cleaner may include a power source (not shown) for supplying power to at least one of the elements included in the cleaner.

In this case, the power source may include the battery discharge control system 100 according to an embodiment of the present disclosure, which includes a battery for storing power supplied from an external power supply device outside the cleaner.

That is, the clean is a cordless device and may be supplied and driven with power from a battery installed in the cleaner without power applied from the outside.

In this case, the battery may receive power from the external power supply device through the power source in wired/wireless charging methods. That is, the battery may be directly connected with the external power supply device through the power source (not shown) included in the cleaner by an element such as a power outlet or wirelessly connected with the external power supply device using any one of a magnetic resonance coupling method, an electromagnetic induction method, and a radio wave method to receive power.

The battery discharge control system included in the cleaner is the same as described above, and thus detailed description thereof will be omitted.

The cleaner according to the embodiment may be applied to an autonomous moving cleaner, which may minimally reduce the burden of the user to operate the cleaner and prevent damages of an air pipe, connector, or the like due to an excessive force, by recognizing a manipulation intention of the user to maintain a distance between the main body and the user at a constant distance.

When the cleaner is the autonomous moving cleaner, the cleaner may further include a driving unit 260 configured to move the main body to track the suction unit 220.

The cleaner may further include a driving wheel 213 installed below the main body 210 and configured to move the main body 210. In this case, the cleaner may include the driving unit 260 having a driving motor and configured to drive the driving wheel by operating the driving motor according to a driving signal. In addition, the cleaner may further include an auxiliary wheel that is not driven by the driving motor and rotates to assist with the driving wheel.

Here, the driving signal may be a signal for moving the main body 210 forward or backward or rotating or stopping the main body 210.

The cleaner may include a sensing unit (not shown) configured to sense movement of the suction unit, a tensile force of the suction unit to the main body, or a distance between the suction unit and the main body.

In addition, the cleaner may further include a control unit 250 that generates a driving signal on the basis of a sensing signal of the sensing unit (not shown). As described above, the control unit 250 may generate the driving signal on the basis of the sensing signal. Furthermore, the control unit 250 may control an overall operation of the cleaner, that is, elements included in the cleaner.

That is, the control unit calculates displacement for maintaining a distance between the user and the main body at a certain value on the basis of the sensing signal from the sensing unit, and the driving motor drives the driving wheel on the basis of the calculated displacement. Driving wheels provided on left and right sides are driven independently from each other to allow the main body to move forward or turn around or allow the main body to always maintain a constant distance from the user. Here, it will be appreciated that the number and arrangement of driving wheels may be changed depending on the design.

In this case, the user can move the cleaner with a small force, thus improving the user's convenience and stability of the product.

Battery Discharge Control Method

Figure 9:
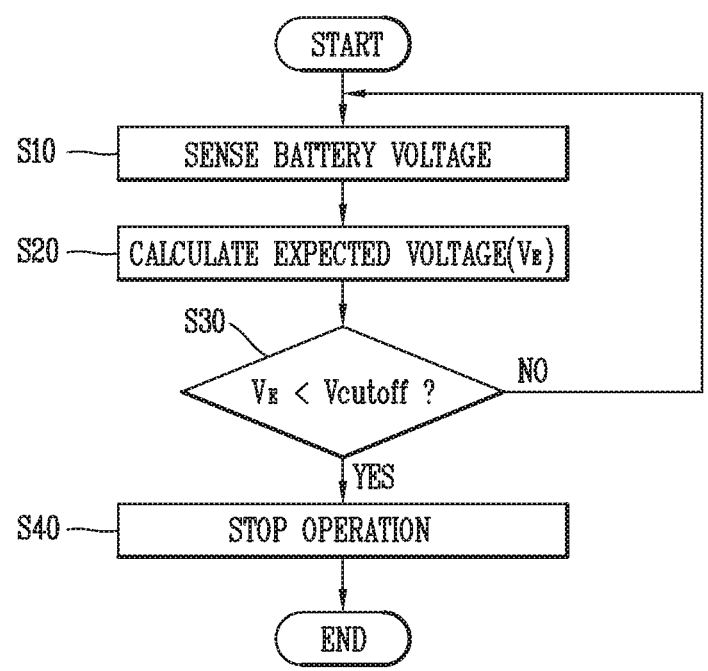
FIG. 9 is a flowchart showing a control method of a battery discharge control system according to an embodiment of the present disclosure.

FIG. 9 is a flowchart showing a control method of a battery discharge control system according to an embodiment of the present disclosure.

As shown in FIG. 9, the control method of the battery discharge control system according to an embodiment of the present disclosure may include sensing, by a voltage sensor, a voltage across a battery (S10), calculating, by a control unit, an expected voltage on the basis of a recovery voltage of the battery and the voltage across the battery (S20), comparing, by the control unit, the expected voltage with a predetermined final discharge voltage (S30), and controlling, by the control unit, power applied to a load having the battery as a power source on the basis of a result of the comparison (S40).

The elements will be described in detail below with reference to FIGS. 1 to 8. Repetitive description on the same elements as those described above will not be provided and detailed description thereof will be omitted.

The voltage sensor 120 may sense a voltage across the battery 110 (S10). The controller 130 may calculate an expected voltage $V_E$ on the basis of a recovery voltage $V_{IR}$ of the battery 110 and the voltage $V_d$ across the battery 110 (S20).

Subsequently, the controller 130 may compare the expected voltage $V_E$ with the predetermined final discharge voltage $V_{cutoff}$ (S30) and may control power applied to the load 150 having the battery 110 as a power source (S40).

According to an embodiment, the controller 130 may discharge the battery 110 until the expected voltage $V_E$ rather than the battery voltage $V_d$ reaches the final discharge voltage $V_{cutoff}$, that is, until the expected voltage $V_E$ decrease to (below) the final discharge voltage $V_{cutoff}$, by driving the load 150.

Accordingly, when the expected voltage $V_E$ is greater than (or equal to) the final discharge voltage $V_{cutoff}$, the controller 130 may sense the battery voltage again (S10) and calculate the expected voltage $V_E$ (S20) to compare the expected voltage $V_E$ with the final discharge voltage $V_{cutoff}$. According to an embodiment, when the expected voltage $V_E$ is smaller than (or equal to) the final discharge voltage $V_{cutoff}$, the controller 130 blocks the power supplied to the load 150 (S40), thus preventing the battery from being damaged or preventing the life of the battery from being reduced.

Thus, as shown in FIG. 4A, the battery discharge control system 100 according to an embodiment of the present disclosure may extend an operation time of the load from T1 to T3 in consideration of the recovery voltage $V_{IR}$. Likewise, in terms of an output current upon discharging the battery, an electric current is output by the battery 110 along a conventional G2a graph. The battery discharge control system 100 according to an embodiment of the present disclosure may operate the load 150 up to T3 by the battery 110 outputting the electric current along a G2b graph.

According to an embodiment of the present disclosure, the control method may further include sensing, by a current sensor 140, an output current of the battery 110 (not shown). Thus the calculating of the expected voltage (S20) may use the output current of the battery 110 to detect the final discharge current $I_e$ and may calculate the recovery voltage $V_{IR}$ on the basis of the final discharge current $I_e$ and a battery internal resistance.

In addition, the calculating of the expected voltage $V_E$ (S20) may calculate the expected voltage $V_E$ on the basis of the calculated recovery voltage $V_{IR}$ or a predetermined recovery voltage $V_{con}$ and a battery voltage $V_d$ sensed by the voltage sensor 120.

According to still another embodiment of the present disclosure, the control method of the battery discharge control system may cut off the power supplied to the load 150 or limit the supplied power instead of cutting off the supplied power.

Figure 10A:
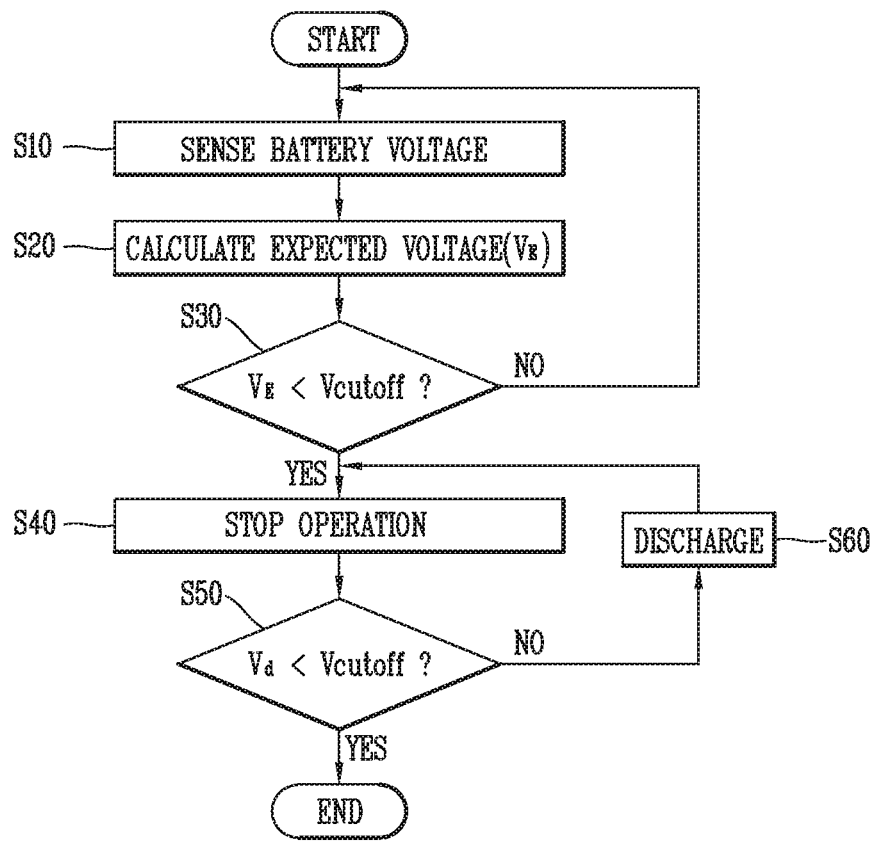
FIGS. 10A and 10B are flowcharts showing a control method of a battery discharge control system according to another embodiment of the present disclosure.
Figure 10B:
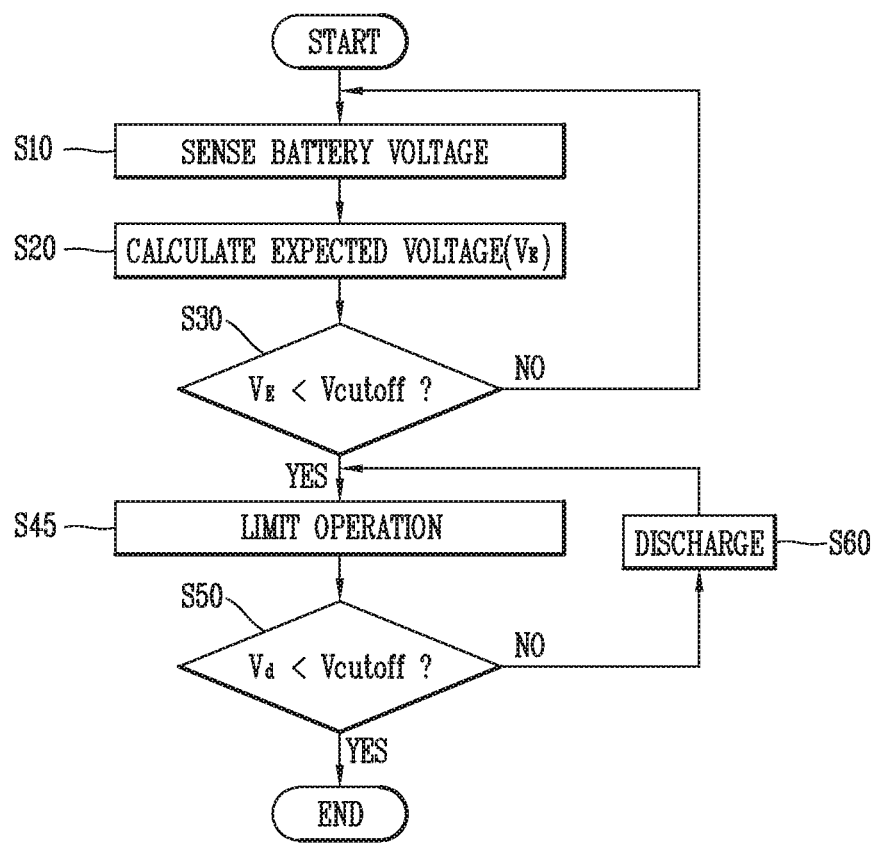

FIG. 10B is a flowchart showing a control method of a battery discharge control system according to an embodiment of the present disclosure.

As shown in FIG. 10B, in the controlling of the output current of the battery (S45), the controller 130 may limit the power supplied to the load 150 and allow the load 150 to perform the limiting operation when the expected voltage $V_E$ is smaller than (or equal to) the final discharge voltage $V_{cutoff}$.

That is, the controller 130 may compare the expected voltage $V_E$ and the final discharge voltage $V_{cutoff}$, supply the power to the load 150 to discharge the battery 110 until the expected voltage reaches the final discharge voltage $V_{cutoff}$, and limit the power supplied to the load 150 when the expected voltage $V_E$ is smaller than (or equal to) the final discharge voltage $V_{cutoff}$ (S45).

The limiting of the power supplied to the load (S45) may include adjusting the magnitude of the output current by controlling the battery 110 to output the current having a smaller magnitude than the final discharge current Ie. Thus, an operating stop time of the electronic device including the battery discharge control system may be variable.

In this case, the controller 130 may deliver a control signal to the load 150 such that the load 150 is driven with a current having a smaller magnitude than the final discharge current Ie.

After the cutting off the power supplied to the load 150 to stop the operation (S40) or the performing the limiting operation (S45), the control method may further include comparing the battery voltage and the final discharge voltage $V_{cutoff}$ of the battery (S50) and consuming and discharging the remaining amount of the battery (S60) when the battery voltage $V_d$ is greater than the final discharge voltage $V_{cutoff}$ of the battery.

In this case, as described above, the stopping of the operation (S40) or the performing of the limiting operation (S45) are performed when the expected voltage $V_E$ is smaller than (or equal to) the final discharge voltage.

After the stopping of the operation (S40) or the performing of the limiting operation (S45), a voltage across the battery 110 may be recovered to increase by a predetermined voltage. In this case, the battery discharge control system according to an embodiment of the present disclosure may consume the remaining power of the battery (S60) in order to consume the increasing recovery voltage.

In this case, the controller 130 consumes the remaining power of the battery in order to consume the recovery voltage. Preferably, the controller 130 may consume the battery 110 until the voltage $V_d$ across the battery 110 reaches the final discharge voltage $V_{cutoff}$.

That is, as an example, when the final discharge voltage $V_{cutoff}$ of the battery 110 is greater than the expected voltage $V_E$, the controller 130 may determines whether to consume the remaining amount of the battery 110 and may consume the remaining amount of the battery when the voltage $V_d$ across the battery is greater than the final discharge voltage $V_{cutoff}$ of the battery.

The controller 130 may consume the remaining power of the battery in various methods. However, according to an embodiment, the controller 130 may supply power to elements included in the battery discharge control system 100. In detail, the controller 130 may supply standby power to at least one of the controller 130 (or the calculation unit 131 and/or the power transfer unit 132 included therein), the voltage sensor 120, and the current sensor 140.

According to still another embodiment, the controller 130 may consume the remaining power of the battery 110 by supplying the power to the load 150.

In this case, the load 150 may be each of the elements included in the electronic device equipped with the battery discharge control system 100 according to an embodiment of the present disclosure.

In detail, as described above, when the cleaner includes the battery discharge control system 100 according to an embodiment of the present disclosure, the controller 130 may supply the remaining power of the battery 110 to at least one of the suction unit 220, the control unit 250, and the driving unit 260 as a standby power or driving power, as shown in FIG. 8. As an example, the controller 130 may drive a suction motor and/or a driving motor included in the suction unit 220 and/or the driving unit 260.

According to still another embodiment, the controller 130 may consume the remaining power of the battery 110 by continuously supplying the power to a discharge circuit (not shown) electrically connected inside or outside the battery discharge control system 100.

In addition, the controller 130 may repeat the above-described discharge process one or more times until the battery voltage $V_d$ is smaller than the final discharge voltage $V_{cutoff}$.

As an example, as shown in FIG. 10A or 10B, after performing the above-described discharge process (S60) and then stopping the operation of the load (S40) or allowing the load to perform the limiting operation (S45), the controller 130 may perform the discharge process again (S60) when the battery voltage $V_d$ is smaller than (or equal to) the final discharge voltage $V_{cutoff}$.

As described above, by consuming the remaining power of the battery 110, it is possible to prevent the load 150 from being restarted although a command for driving the load 150 is received after the battery is recognized as being completely discharged to cut off the power supplied to the load 150.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet).

As broadly described and embodied herein, an aspect of the detailed description is to provide a battery discharge control system for controlling a discharge of the battery to secure a use time of an electronic device with a battery or prevent the electronic device from being restarted after the battery is completely discharged, a control method thereof, and a cleaner including the same.

To achieve these and other advantages and in accordance with the purpose of this specification, as embodied and broadly described herein, there is provided a battery discharge control system including a voltage sensor configured to sense a voltage across a battery and a controller configured to calculate an expected voltage based on a recovery voltage of the battery and the voltage across the battery, compare the expected voltage and a predetermined final discharge voltage, and control power applied to a load having the battery as a power source.

The battery discharge control system may further include a current sensor configured to sense an output current of the battery, in which the controller uses an output current of the battery to detect a final discharge current and calculate the recovery voltage based on the final discharge current and an internal resistance of the battery.

The controller may cut off the power supplied to the load when the expected voltage is smaller than the predetermined final discharge voltage.

The controller may include a calculation unit configured to calculate the expected voltage and a power transfer unit configured to control whether to apply the power of the battery to the load based on a result of the comparison.

The battery discharge control system may further include a current sensor configured to sense an output current of the battery, in which the calculation unit is configured to use the output current of the battery to detect a final discharge current and calculate the recovery voltage based on the final discharge current and an internal resistance of the battery, and the power transfer unit is connected in series with the battery and the current sensor.

The controller may control the battery to output a current having a smaller magnitude than the final discharge current when the expected voltage is smaller than the predetermined final discharge voltage.

The controller may deliver a control signal to the load such that the load is driven with the current having a smaller magnitude than the final discharge current.

The controller may determine whether to consume the remaining amount of the battery based on the voltage across the battery and the final discharge voltage of the battery when the expected voltage is smaller than the final discharge voltage.

The controller may consume the remaining amount of the battery by driving at least one of the controller, the load, and the voltage sensor through the battery when the voltage across the battery is greater than the final discharge voltage of the battery.

The controller may determine whether to consume the remaining amount of the battery when the final discharge voltage of the battery is greater than the expected voltage.

There is also provided a cleaner including a main body, a suction unit having a handle and configured to suck up surrounding foreign material; an air pipe configured to connect the main body and the suction unit and guide the foreign material into the main body; and the above-described battery discharge control system.

The load may include at least one of a suction unit including a suction motor for creating a suction force and a control unit configured to control the suction unit.

There is also provided a control method of a battery discharge control system, the control method including sensing a voltage across a battery by a voltage sensor, calculating an expected voltage based on a recovery voltage of the battery and the voltage across the battery by a controller, comparing the expected voltage and a predetermined final discharge voltage by the controller, and controlling power applied to a load having the battery as a power source by the controller.

The control method may further include sensing an output current of the battery by a current sensor, in which the calculating of the expected voltage includes using the output current of the battery to detect a final discharge current and calculate the recovery voltage based on the final discharge current and an internal resistance of the battery.

The control method may further include cutting off the power supplied to the load when the expected voltage is less than the predetermined final discharge voltage.

The control method may further include controlling the battery to output a current having a smaller magnitude than the final discharge current when the expected voltage is smaller than the final discharge voltage.

The controlling of the power applied to the load may include delivering a control signal to the load by the controller such that the load is driven with the current having a smaller magnitude than the final discharge current.

The control method may further include determining whether to consume the remaining amount of the battery based on the voltage across the battery and the final discharge voltage of the battery when the expected voltage is smaller than the final discharge voltage.

The control method may further include consuming the remaining amount of the battery by driving at least one of the controller, the load, and the voltage sensor through the battery, when the voltage across the battery is greater than the final discharge voltage of the battery.

The controller may determine whether to consume the remaining amount of the battery when the final discharge voltage of the battery is greater than the expected voltage.

There is also provided a computer-readable recording medium storing a computer program for executing the control method of the battery discharge control system.

Any reference in this specification to "one embodiment," an "embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A battery discharge control system comprising:
   a voltage sensor configured to sense a voltage across a battery;
   a current sensor configured to sense an output current of the battery; and
   a controller configured to control battery discharge to a load using the sensed voltage across the battery, wherein an expected voltage is calculated based on a recovery voltage of the battery and the voltage across the battery, the expected voltage and a predetermined final discharge voltage are compared, and power applied to the load having the battery as a power source is controlled based on the comparison,
   wherein the controller uses an output current of the battery to detect a final discharge current, and controls the output current of the battery to be lower than the final discharge current after the voltage across the battery reaching the predetermined final discharge voltage until when the expected voltage is lower than the predetermined final discharge voltage.

2. The battery discharge control system of claim 1, wherein the controller calculates the recovery voltage based on the final discharge current and an internal resistance of the battery.

3. The battery discharge control system of claim 2, wherein the controller controls the battery to output a current having a smaller magnitude than the final discharge current when the expected voltage is less than the predetermined final discharge voltage.

4. The battery discharge control system of claim 3, wherein the controller delivers a control signal to the load such that the load is driven with the current having a smaller magnitude than the final discharge current.

5. The battery discharge control system of claim 1, wherein the controller cuts off the power supplied to the load when the expected voltage is smaller than the predetermined final discharge voltage.

6. The battery discharge control system of claim 1, wherein the controller comprises:
   a calculation module configured to calculate the expected voltage; and
   a power transfer module configured to control whether to apply the power of the battery to the load based on a result of the comparison.

7. The battery discharge control system of claim 6, further comprising a current sensor configured to sense an output current of the battery, wherein
   the calculation module is configured to use the output current of the battery to detect a final discharge current and calculate the recovery voltage based on the final discharge current and an internal resistance of the battery, and
   the power transfer module is connected in series with the battery and the current sensor.

8. The battery discharge control system of claim 1, wherein the controller determines whether to allow consumption of the remaining amount of power in the battery based on the voltage across the battery and the final discharge voltage of the battery when the expected voltage is less than the final discharge voltage.

9. The battery discharge control system of claim 8, wherein the controller allows consumption of the remaining amount of power in the battery by driving at least one of the controller, the load, or the voltage sensor through the battery when the voltage across the battery is greater than the final discharge voltage of the battery.

10. The battery discharge control system of claim 8, wherein the controller determines whether to allow consumption of the remaining amount of power in the battery when the final discharge voltage of the battery is greater than the expected voltage.

11. A cleaner comprising:
    a main body;
    a suction module having a handle and configured to suck up surrounding foreign material;
    an air pipe configured to connect the main body and the suction module and guide the foreign material into the main body; and
    a battery discharge control system according to claim 1.

12. The cleaner of claim 11, wherein the load comprises at least one of a suction module including a suction motor for creating a suction force or a control module configured to control the suction module.

13. A control method of a battery discharge control system, the control method including:
    sensing a voltage across a battery by a voltage sensor;
    sensing an output current of the battery by a current sensor;
    calculating an expected voltage based on a recovery voltage of the battery and the voltage across the battery by a controller;
    comparing the expected voltage and a predetermined final discharge voltage by the controller; and
    controlling power applied to a load having the battery as a power source by the controller,
    wherein the calculating of the expected voltage comprises using the output current of the battery to detect a final discharge current,
    wherein the controlling power applied to a load having the battery as a power source comprises controlling the output current of the battery to be lower than the final discharge current after the voltage across the battery reaching the predetermined final discharge voltage until when the expected voltage is lower than the predetermined final discharge voltage.

14. The control method of claim 13,
    wherein the calculating the expected voltage comprises using the output current of the battery to calculate the recovery voltage based on the final discharge current and an internal resistance of the battery.

15. The control method of claim 14, wherein the controlling power applied to the load comprises controlling the battery to output a current having a smaller magnitude than the final discharge current.

16. The control method of claim 15, wherein the controlling power applied to the load comprises delivering a control signal to the load by the controller such that the load is driven with the current having a smaller magnitude than the final discharge current.

17. The control method of claim 13, wherein the controlling of the power applied to the load comprises cutting off the power supplied to the load when the expected voltage is less than the predetermined final discharge voltage.

18. The control method of claim 13, further comprising determining whether to allow consumption of the remaining amount of power in the battery based on the voltage across the battery and the final discharge voltage of the battery when the expected voltage is less than the final discharge voltage.

19. The control method of claim 18, further comprising allowing consumption of the remaining amount of power in the battery by driving at least one of the controller, the load, or the voltage sensor through the battery, when the voltage across the battery is greater than the final discharge voltage of the battery.

20. The control method of claim 18, wherein the controller determines whether to allow consumption of the remaining amount of power in the battery, when the final discharge voltage of the battery is greater than the expected voltage.

* * * * *